United States Patent
Scharmach et al.

(10) Patent No.: US 12,331,992 B2
(45) Date of Patent: Jun. 17, 2025

(54) METHOD FOR CONTROLLING A RECYCLE GAS STREAM UTILIZING AN EJECTOR FOR THE COOLING OF A UNIT OPERATION

(71) Applicants: William J Scharmach, Grand Island, NY (US); Richard M Kelly, East Amherst, NY (US); Mohammad Abdul-Aziz Rashad, Clarence, NY (US); Yi Ma Lenhert, Tomball, TX (US); Matthew Thomas, Spring, TX (US)

(72) Inventors: William J Scharmach, Grand Island, NY (US); Richard M Kelly, East Amherst, NY (US); Mohammad Abdul-Aziz Rashad, Clarence, NY (US); Yi Ma Lenhert, Tomball, TX (US); Matthew Thomas, Spring, TX (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 34 days.

(21) Appl. No.: 15/382,823

(22) Filed: Dec. 19, 2016

(65) Prior Publication Data
US 2018/0172322 A1 Jun. 21, 2018

(51) Int. Cl.
| F25D 3/10 | (2006.01) |
| F17C 5/02 | (2006.01) |
| F17C 9/02 | (2006.01) |
| F28C 3/08 | (2006.01) |

(52) U.S. Cl.
CPC ............ *F25D 3/10* (2013.01); *F17C 5/02* (2013.01); *F17C 9/02* (2013.01); *F28C 3/08* (2013.01); *F17C 2227/0135* (2013.01)

(58) Field of Classification Search
CPC ...... F17C 9/02; F17C 2227/0135; F17C 5/02; F28C 3/08; F25D 3/10; F25D 3/102; F25D 3/105; F25D 3/107
See application file for complete search history.

(56) References Cited

U.S. PATENT DOCUMENTS

| 2,620,967 A | 12/1952 | Worn |
| 3,367,402 A * | 2/1968 | Cross, Jr. ............... F28C 3/06 |
| | | 165/104.32 |
| 4,130,575 A * | 12/1978 | Jorn ...................... C07C 1/06 |
| | | 48/197 R |
| 4,430,865 A | 2/1984 | Davis |
| 5,386,872 A | 2/1995 | Chang |
| 6,622,496 B2 | 9/2003 | Cheng et al. |
| 7,608,129 B2 | 10/2009 | Zendejas-Martinez |
| 8,815,961 B2 * | 8/2014 | Menzel ............... C07C 1/0485 |
| | | 422/198 |

(Continued)

FOREIGN PATENT DOCUMENTS

| CN | 101460637 A | 6/2009 |
| EP | 0838429 A1 | 4/1998 |

*Primary Examiner* — Tavia Sullens
(74) *Attorney, Agent, or Firm* — Iurie A. Schwartz

(57) ABSTRACT

The present invention relates to a method of preparing a gas coolant for the direct cooling of a unit operation under a fixed heat load from its normal operating temperature (e.g., 300° F. and above) to a lower temperature (e.g., below 100° F.) in order to allow for maintenance or other non-routine work to be carried out in said unit operation.

12 Claims, 5 Drawing Sheets

(56) References Cited

U.S. PATENT DOCUMENTS

| | | |
|---|---|---|
| 9,134,064 B2 | 9/2015 | Mathur |
| 10,156,402 B1 * | 12/2018 | Carlson ................... F28C 3/08 |
| 2014/0202192 A1 | 7/2014 | Harrington |
| 2014/0202204 A1 | 7/2014 | Harrington |
| 2014/0202205 A1 | 7/2014 | Harrington |

* cited by examiner

Nitrogen usage (kscf) versus time required to achieve a reactor bed temperature of 100°F using the once-through method of the related art and the direct cooling method of the present invention Reactor bed temperature and Nitrogen usage (kscf) versus time required to achieve a reactor bed temperature of 100°F using the once-through method of the related art and the direct cooling method of the present invention Nitrogen usage (kscf) versus time required to achieve a reactor bed temperature of 100°F using the once-through method of the related art and the direct cooling method of the present invention

METHOD FOR CONTROLLING A RECYCLE GAS STREAM UTILIZING AN EJECTOR FOR THE COOLING OF A UNIT OPERATION

FIELD OF THE INVENTION

The present invention relates to a method of preparing a gas coolant for the direct cooling of a unit operation under a fixed heat load from its normal operating temperature (e.g., 300° F. and above) to a lower temperature (e.g., below 100° F.) in order to allow for maintenance or other non-routine work to be carried out in said unit operation. More specifically, the unit operation is cooled with a fluid that is generated by providing and mixing a cold fluid with a portion of effluent gas from the unit operation. The cold fluid is used as a motive force for a non-mechanical pump that is used to recirculate a portion of the effluent gas from the unit operation. The effluent gas is combined with the cold fluid to create a cooling stream which is routed to the unit operation to cool same using direct contact heat exchange.

DESCRIPTION OF THE RELATED ART

Equipment used in elevated temperature unit operations, such as those seen in chemical and petrochemical processing undergo routine maintenance that is sometimes preceded by a cool down step wherein the equipment is brought down to a temperature below that of normal operations. It will be understood by those skilled in the art that unit operation as utilized herein refers to any part of a single-step or multiple-step process involved in the physical or chemical change of material. Examples of a unit operation include separation, purification, mixing, reacting, power generation, heat exchange, and other synthesizing, storage, and analysis steps. The equipment and its constituents at this low-temperature condition are considered "non-operational" or shut down as the state is not conducive to normal operations. The cooled state of equipment quenches any component activity and allows for safe system entry, handling and change of the components, and/or other maintenance activities. The cooling of equipment can be a critical step to getting the equipment back online as quick as possible as it can delay any subsequent maintenance. For example, the catalyst used in refinery processes such as hydrotreating, hydrocracking, reforming, and recovery require frequent changing due to the catalyst beds deactivating over time. Before changing the catalyst, the unit operation equipment requires cooling to ambient temperatures. With the high operating temperatures normally used in refining processes (temperatures can range from 300° F. to above 1000° F.) this can often lead to a bottleneck in the turnaround process given the amount of catalyst and the size (and mass) of the equipment.

Customers with existing cooling capabilities (i.e., ability to remove heat) may be able to reduce temperature to a certain point before the heat removal (i.e. the rate of unit operation temperature reduction) becomes more difficult. As will be recognized by those skilled in the art, assisted or accelerated cooldown is the process of adding cold inert gas to a process gas stream to drive a more rapid cooldown. The cold gas improves heat transfer by increasing available refrigeration and widening the temperature difference between the coolant and unit operation equipment. The improved heat transfer reduces turnaround time and allows the equipment to be brought back online faster. The inert gasses used in assisted cooldown can include nitrogen, argon, carbon dioxide, or helium; but generally, the low cost of nitrogen makes it the preferable coolant gas. The gas also assists in inerting the environment for components that may react with combustibles, oxygen, or other reactive fluids.

The injection of coolant gas is completed two ways depending on the existing equipment utilized in the unit operation. Using a "once-through" process is the most common cooling method where gas is passed directly through the unit operation equipment at a target temperature (~−50° to 300° F.) with all gas injected exiting the system after one pass. The once-through process is the simplest to employ, but coolant use is at its highest, leading to greater costs and potential flow limitations due to emissions. For an operator flaring their waste stream, these flow limitations maintain combustion efficiency at the flare system, thereby restricting the amount of inert gas capable of exiting the unit operation and vented to the flare at any one point. A flare system in just one of several options for the final gas discharge. Waste streams may be sent to vapor recovery units, thermal oxidizers, or other environmental controls units which would require handling the extra flow as a result of the injected coolant.

Alternatively, cryogenic fluids (liquids or gas at a temperature of ~−452° F. to 50° F.) can be mixed with process gasses to achieve an accelerated cooldown. The combination of hot system fluids with cryogenic temperatures allows the process gas to reach the desired target temperature before entering the unit operation (~−50° F. to 300° F.). Specialized equipment may be used to blend the cryogenic gas with the process gas stream as it recirculates through the unit operation. The gas loops continuously cooling the unit operation equipment with some gas vented to offset the injected gas. Due to the lowered gas injection rates required (achieving the same desired target temperature), this method results in both improved cooldown rates and reduced costs.

The ability to practice the blending of cryogenic gas with an existing process gas stream is dependent on a recycle compressor, a piece of equipment used to circulate the process gas through the unit operation. The recycle compressor in this scenario is seen as a requirement of normal processes, where recycling of fluids is required general production. In some situations ancillary equipment specifically used for cooling may also be permanently installed. Processes missing or unable to use a recycle compressor are therefore unable to apply this method and may only utilize once-through assisted cooling. These systems could be enabled to practice cryogenic gas cooling if a capable recycle compressor was available.

Davis (U.S. Pat. No. 4,430,865) discloses a cryogenic gas cool down method. The process utilizes a preexisting recycle compressor provided by the unit operation operator to recirculate the coolant gas stream. For oil and gas refining facilities, an electrically-driven reciprocating or centrifugal compressor are most commonly used for recycling a process stream gas. Without this essential piece of equipment or a similar unit specifically installed for use during a cool down, refiners would be unable to practice this cooldown method.

To overcome the disadvantages of the related art, the present invention is an improvement over the once-through cryogenic gas cooldown method, as described in Davis, as an enabler for a unit operation not having the necessary pumping equipment. The process of the present invention utilizes an ejector, a type of pump that uses pressure energy of a motive fluid (or fluid that imparts motion) converted to velocity energy, which creates a suction zone in the body of the ejector. The ejector is used to circulate the process stream while injecting a coolant gas into the unit operation. Davis may also require a static mixing element to promote good mixing of the cryogenic fluid and the process gas stream, whereas the application of the ejector in the present invention provides a high mixing zone located in the body where the process gas stream and cryogenic fluid are thoroughly mixed.

Ejectors have been previously used in the application of cooling as disclosed in Martinez (U.S. Pat. No. 7,608,129) and Cheng et al. (U.S. Pat. No. 6,622,496). In these documents, the application of the ejector is used in the cooling of a continuous heat load where heat is constantly added to the process stream. The cooling systems are designed to manage unit operation temperature based on the heat added to the system. Fluids that are in direct contact with the interior (and exposed to the process stream) of the unit operation are required to be "process compatible," meaning that the fluid is not disruptive to the unit operation. Incompatible fluids are those that are reactive with process products, can halt reactivity, or provide inordinate or inadequate cooling. This type of heat management is in contrast to the stated invention as equipment is targeted for shutdown and maintenance. The unit operation is determined to have a "fixed" heat load, meaning operations have been completed, and no further heat is added to the system. The cooling fluid can also be incompatible with process conditions and may be selected based on the shutdown needs, such as inerting the system environment. Therefore, the invention performs and is controlled in a manner conducive to a shutdown state.

Other objects and aspects of the present invention will become apparent to one of ordinary skill in the art upon review of the specification, drawings and claims appended hereto.

SUMMARY OF INVENTION

The present invention describes a method and associated system for the direct cooling of a unit operation under a fixed heat load from an elevated temperature to a lower temperature wherein the unit operation is cooled with a cooling fluid that is generated by providing a vaporized fluid, providing a source of effluent gas from the unit operation, using a non-mechanical pump to combine said vaporized fluid and a portion of unit operation effluent to create a cooling stream; and passing the cooling stream through the unit operation to cool it using direct contact heat exchange. The temperature of the combined fluid is then controlled by raising or lowering the temperature of the cryogenic fluid exiting the vaporizer and manipulating the ratio of the unit operation effluent gas mixed with the cryogenic fluid. The vaporized fluid can be supplied by either vaporizing a cryogenic liquid supplied from a tank or by directly providing a chilled vapor stream such as one from a pipeline source.

In accordance with one aspect of the invention, a method of direct cooling of a unit operation under a fixed heat load to a lower temperature wherein the unit operation is cooled with a cooling stream routed from a non-mechanical pump where the cooling stream is a combination of a vaporized motive fluid stream with at least a portion of an effluent gas stream from the unit operation. The method includes:
 a. circulating a portion of the unit operation effluent having a temperature in the range of approximately 50-500° F. with the non-mechanical pump where the vaporized fluid is provided as a motive force;
 b. providing the vaporized motive fluid stream to the non-mechanical pump at a temperature in the range of about −452° F. to about 50° F.;
 c. combining the unit operation effluent and the vaporized motive fluid in said non-mechanical pump, wherein the combined stream has a temperature in the range of about −50° F. to about 300° F.
 d. adjusting the ratio of the mass flow rates of the unit operation effluent stream to the vaporized motive fluid stream combined in the non-mechanical pump wherein the ratio is determined by:

$$\text{Recycle Ratio}_{mass} = \frac{C_{Mot} * (T_C - T_{Mot})}{C_{Eff} * (T_{Eff} - T_C)}$$

where,
Recycle Ratio$_{mass}$ is the ratio of the mass flow rate of the effluent to the mass flow rate of the vaporized motive fluid;
$C_{Mot}$ is the specific heat of the vaporized motive fluid;
$C_{Eff}$ is the specific heat of the unit operation effluent stream entering the non-mechanical pump;
$T_C$ is the temperature of the combined fluid or the target temperature of the gas stream exiting the non-mechanical pump;
$T_{Mot}$ is the temperature of the vaporized motive fluid, selected by the operator;
$T_{Eff}$ is the temperature of the unit operation effluent stream entering the non-mechanical pump.

In another aspect of the invention, method for the direct cooling of a unit operation under a fixed heat load to a lower temperature wherein the unit operation is cooled with a cooling stream routed from a non-mechanical pump where the cooling stream is a combination of a vaporized motive fluid stream with at least a portion of an effluent gas stream from the unit operation. The method includes:
 a. circulating a portion of the unit operation effluent having a temperature in the range of approximately 50-500° F. with the non-mechanical pump where the vaporized fluid is provided as a motive force;
 b. providing the vaporized motive fluid stream to the non-mechanical pump at a temperature in the range of about −452° F. to about 50° F.;
 c. combining the unit operation effluent and the vaporized motive fluid in said non-mechanical pump, wherein the combined stream has a temperature in the range of about −50° F. to about 300° F.
 d. adjusting the temperature of the vaporized motive stream to be combined with the unit operation effluent stream in the non-mechanical pump wherein the temperature is determined by:

$$T_{Mot} = T_C - \frac{\text{Recycle Ratio}_{mass} * C_{Eff} * (T_{Eff} - T_C)}{C_{Mot}}$$

where,
Recycle Ratio$_{mass}$ is the ratio of the mass flow rate of the effluent to the mass flow rate of the vaporized motive fluid, selected by the operator;
$C_{Mot}$ is the specific heat of the vaporized motive fluid;
$C_{Eff}$ is the specific heat of the unit operation effluent stream entering the non-mechanical pump;
$T_C$ is the temperature of the combined fluid or the target temperature of the gas stream exiting the non-mechanical pump;
$T_{Mot}$ is the temperature of the vaporized motive fluid;

$T_{Eff}$ is the temperature of the unit operation effluent stream entering the non-mechanical pump.

In yet another aspect of the invention, a method for the direct cooling of a unit operation under a fixed heat load to a lower temperature wherein the unit operation is cooled with a cooling stream routed from a non-mechanical pump were the cooling stream is a combination of a vaporized fluid stream with at least a portion of an effluent gas stream from the unit operation is provided. The method includes:
 a. circulating a portion of the unit operation effluent having a temperature in the range of approximately 50-500° F. by the non-mechanical pump where the vaporized fluid stream is provided as a motive force;
 b. providing the motive fluid stream to the non-mechanical pump at a temperature in the range of about −452° F. to about 0° F.;
 c. combining the unit operation effluent and the motive fluid in said non-mechanical pump, wherein the combined stream has a temperature in the range of about 50° F. to about 300° F. is introduced into the pipe system
 d. providing an industrial gas liquid at the temperature range of about −452° F. to about 0° F. and combining the liquid with the unit operation effluent upstream of the jet compressor or with the mixture of the unit operation effluent and motive fluid downstream of the jet compressor
 e. adjusting the ratio of the mass flow rates of the unit operation effluent stream to the vaporized motive fluid stream combined in the non-mechanical wherein the ratio is determined by:

$$\text{Recycle Ratio ("}RR\text{")}\left(\frac{Suc}{Mot}\right)_{mass} = \frac{C_{Mot}*(T_C - T_{Mot})}{C_{Eff}*(T_{Eff} - T_C) - \left[\frac{1}{RR\left(\frac{Suc}{BLiq}\right)_{mass}} *(C_{BLiq}*(T_C - T_{BLiq}) + \lambda_{BLiq})\right]}$$

$$RR\left(\frac{Suc}{Mot}\right)_{mass}$$

is defined by the ratio of the mass flow rate of the unit operation effluent $\dot{M}_{Eff}$ to the mass flow rate of the vaporized motive fluid stream $\dot{M}_{Mot}$.

$$RR\left(\frac{Suc}{Mot}\right)_{mass} = \frac{\dot{M}_{Eff}}{\dot{M}_{Mot}}$$

$$RR\left(\frac{Suc}{BLiq}\right)_{mass}$$

is defined by the ratio of the mass flow rate of the unit operation effluent $\dot{M}_{Eff}$ to the mass flow rate of the bypass liquid $\dot{M}_{BLiq}$, selected by the operator $$RR\left(\frac{Suc}{BLiq}\right)_{mass} = \frac{\dot{M}_{Eff}}{\dot{M}_{BLiq}}$$

$C_{Mot}$ is the specific heat of the motive fluid;
$C_{Eff}$ is the specific heat of the unit operation effluent stream entering the non-mechanical pump;
$C_{BLiq}$ is the specific heat of the liquid bypassing the vaporizer and jet compressor;
$T_C$ is the temperature of the combined fluid or the target temperature of the gas stream exiting the non-mechanical pump;
$T_{Mot}$ is the temperature of the motive fluid selected by the operator;
$T_{Eff}$ is the temperature of the unit operation effluent stream entering the non-mechanical pump;
$T_{BLiq}$ is the temperature of the liquid bypassing the vaporizer and jet compressor;
$\lambda_{BLiq}$ is the specific latent heat of vaporization of the liquid bypassing the vaporizer and jet compressor.

In yet another aspect of the invention, a method for the direct cooling of a unit operation under a fixed heat load to a lower temperature wherein the unit operation is cooled with a cooling stream routed from a non-mechanical pump were the cooling stream is a combination of a vaporized fluid stream with at least a portion of an effluent gas stream from the unit operation is provided. The method includes:
 a. circulating a portion of the unit operation effluent having a temperature in the range of approximately 50-500° F. by the non-mechanical pump where the vaporized fluid stream is provided as a motive force;
 b. providing the motive fluid stream to the non-mechanical pump at a temperature in the range of about −452° F. to about 0° F.;
 c. combining the unit operation effluent and the motive fluid in said non-mechanical pump, wherein the combined stream has a temperature in the range of about 50° F. to about 300° F. is introduced into the pipe system
 d. providing an industrial gas liquid at the temperature range of about −452° F. to about 0° F. and combining the liquid with the unit operation effluent upstream of the jet compressor or with the mixture of the unit operation effluent and motive fluid downstream of the jet compressor
 e. adjusting the temperature of the vaporized motive stream to be combined with the unit operation effluent stream in the non-mechanical pump wherein the temperature is determined by:

$$T_{Mot} = T_C - \frac{RR\left(\frac{Suc}{Mot}\right)_{mass}*C_{Eff} - (T_{Eff} - T_C) - \frac{RR\left(\frac{BLiq}{Mot}\right)_{mass}*(C_{BLiq}*(T_C - T_{BLiq}) - \lambda_{BLiq})}{C_{Mot}}}$$

$$RR\left(\frac{Suc}{Mot}\right)_{mass}$$

is defined by the ratio of the mass flow rate of the unit operation effluent $\dot{M}_{Eff}$ to the mass flow rate of the vaporized motive fluid stream $\dot{M}_{Mot}$, and is selected by the operator;

$$RR\left(\frac{Suc}{Mot}\right)_{mass} = \frac{\dot{M}_{Eff}}{\dot{M}_{Mot}}$$

$$RR\left(\frac{Bliq}{Mot}\right)_{mass}$$

is defined by the ratio of the mass flow rate of the bypass liquid $\dot{M}_{BLiq}$ to the mass flow rate of the vaporized motive fluid stream $\dot{M}_{Mot}$, and is selected by the operator;

$$RR\left(\frac{Bliq}{Mot}\right)_{mass} = \frac{\dot{M}_{BLiq}}{\dot{M}_{Mot}}$$

$C_{Mot}$ is the specific heat of the motive fluid;
$C_{Eff}$ is the specific heat of the unit operation effluent stream entering the non-mechanical pump;
$C_{BLiq}$ is the specific heat of the liquid bypassing the vaporizer and jet compressor;
$T_C$ is the temperature of the combined fluid or the target temperature of the gas stream exiting the non-mechanical pump;
$T_{Mot}$ is the temperature of the motive fluid;
$T_{Eff}$ is the temperature of the unit operation effluent stream entering the non-mechanical pump;
$T_{BLiq}$ is the temperature of the liquid bypassing the vaporizer and jet compressor;
$\lambda_{BLiq}$ is the specific latent heat of vaporization of the liquid bypassing the vaporizer and jet compressor.

BRIEF DESCRIPTION OF THE DRAWINGS

The objects and advantages of the invention will be better understood from the following detailed description of the preferred embodiments thereof in connection with the accompanying figure wherein like numbers denote same features throughout and wherein.

DETAILED DESCRIPTION OF THE INVENTION

To enable the use of a cryogenic fluid (provided in a vapor or liquid form) and improve the efficiency of cooling during turnaround, the invention utilizes a recycle process installed on the unit operation system targeted for cooldown in a temporal fashion of a unit operation. This would include the cooling multiple unit operations configured in parallel or in series, or cooling multiple sections of the same unit operation at the same time were flow is routed to multiple entry points on the same unit operation. The recycling process includes a jet compressor and associated pipes and valves to control the flow a gasses within the unit. It will be recognized by those skilled in the art, that a jet compressor as utilized herein can be an ejector, jet pump, eductor, or another venturi-type pump. The jet compressor is employed to regulate and mix warm unit operation effluent gasses with cold (−452° F. to 50° F.) gas to achieve the target gas temperature and flow rate.

A jet compressor is a type of ejector that uses high-pressure gas jet (motive) to entrain a lower pressure gas stream (suction). The two streams are mixed and discharged at an intermediate pressure. As the gas passes through the converging nozzle of the jet compressor, potential energy is converted into kinetic energy resulting in a high-velocity jet flow. This change in energy results in a localized decrease in static pressure that creates suction within the body of the jet compressor. The suction allows gas to be drawn into the jet compressor and is entrained by the motive fluid. The jet compressor serves a dual purpose: mixing fluids within the body as well as drawing material into the fluid to ensure intimate mixing. Control of the final gas temperature relies heavily on the relationship of motive flow (i.e., the incoming high-pressure gas flow to the jet compressor) to suction flow entrained (i.e., the unit operation effluent gas). A specialized high-pressure, high-flow gas pumper serves as the source of both potential energy and feed or motive flow to the jet compressor.

Figure 1:
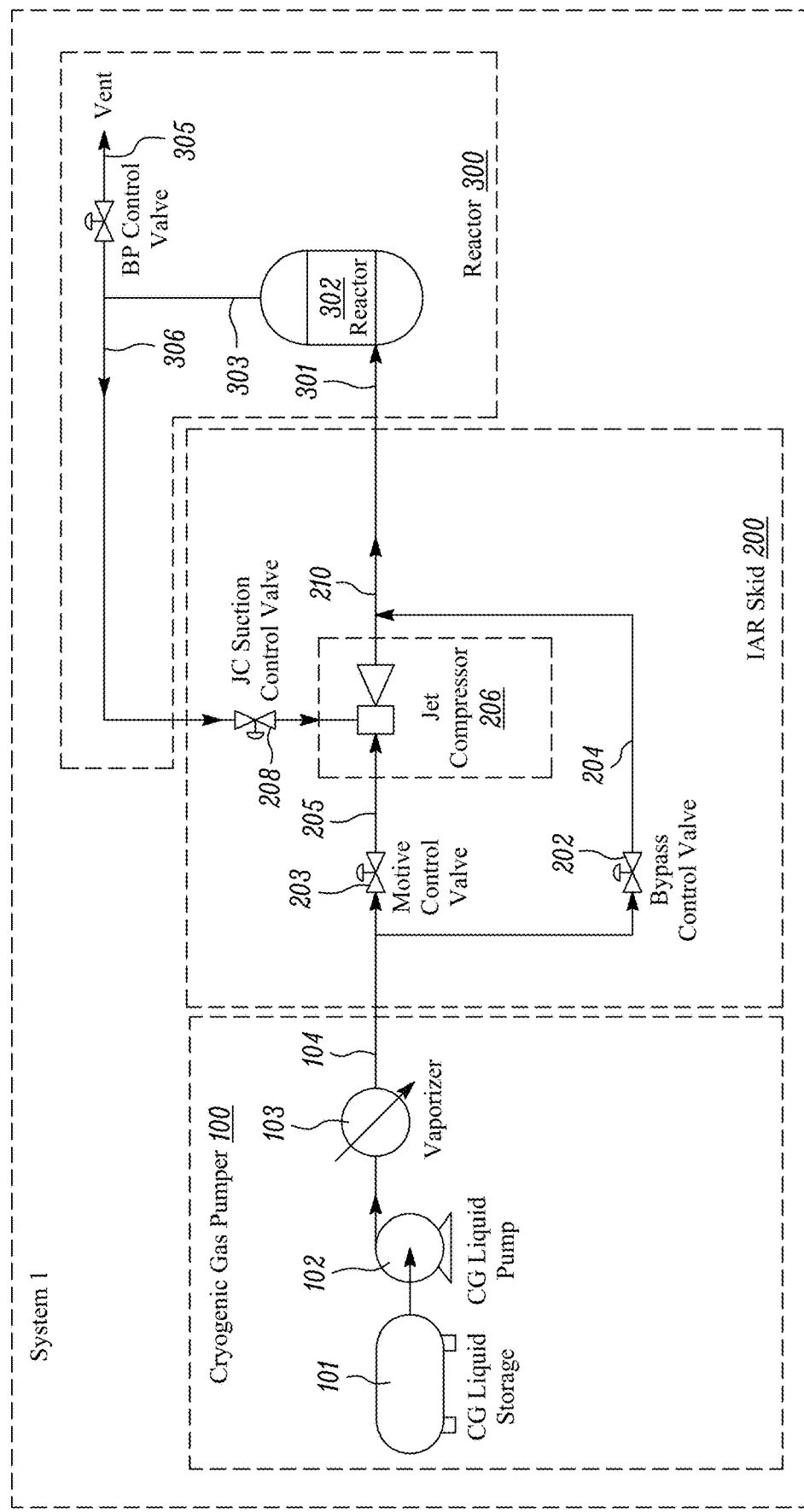
FIG. 1 is a process schematic of the invention applied in cooldown where a cryogenic pumping system is employed to provide a cold gas mixed with effluent from the unit operation in order to cool the unit operation.

The system 1, depicted in FIG. 1, includes various pipes, valves, and instrumentation used to regulate the flow in the jet compressor. System 1 is employed to prepare and inject a gas coolant for cooling a unit operation system 300, and its constituents, such as catalysts, vessels, and pipes from an elevated temperature (about 300° F. to 500° F.) to ambient (below 100° F.) with a total operating range temperature between 50° F. to 300° F. In this scenario, the operator would first cool the unit operation system 300 from operating temperature (e.g., 1000° F. to 400° F.) with preexisting cooling equipment (e.g. chiller or heat exchanger, not shown-in FIG. 1) to a point in which their cooling rates begin to ramp down or taper off (e.g., below ~300° F.). System 1 would provide cooling to maintain or improve the cooldown rates (e.g. below 300° F.). Generally, fluid temperatures entering the unit operation 302 is adjusted to some delta of the unit operation's 302 current temperature or to a minimum working temperature of around-50° F. to 65° F. More specifically, system 1 includes three sections in fluid communication: cryogenic gas pumper 100, the injection and recycle skid 200, and the target unit operation system 300, which is inclusive of unit operation 302.

The cryogenic gas pumper 100 provides coolant in the form cold gas (from −452° F. to 50° F. @ 14.7 to 2,000 psi) (or liquid at −452 to 50° F.) at a rate of around 1,000 to 5,000,000 sch/hr and acts as the main source of pressure, flow, and motive force for the injection and recycle skid 200 (also referred to at times, as the "IAR skid"). A cryogenic storage vessel 101 provides liquid flow to a pump 102 that feeds into a heater/heat exchanger 103 that vaporizes the liquid. In this exemplary embodiment, pump 102 is a cryogenic liquid pump, but other similar pumps can be employed. Once vaporized, the gaseous fluid is directed to the injection and recycle system 200 via lines 104. The temperature of the gas stream entering the injection and recycle skid 200 is controlled by an onboard control system (not shown) regulating the heat input to the vaporizer 103.

The injection and recycle skid 200 comprises of various pipes, valves, and instrumentation used to regulate the flow into the jet compressor or multiple jet compressors 206 and the downstream unit operation system 300. The cold gas (ranging from about −452° F. to 50° F. @ 14.7 to 2,000 psi) from pumper 102 enters IAR skid 201 and is sent either through the jet compressor 206 where it is tempered (to about −50° F. to 100° F. or unit operation temperature −ΔT @ 14.7 to 1,000 psi) by a hot effluent stream 306 (from 50° F. to 500° F. @ 14.7 to 1,000 psi) coming from the unit operation 302 or bypassed around the jet compressor as stream 204 to provide "clean" coolant to the unit operation in the situation where system 1 is being purged or inerted. The hot effluent stream 306 is pumped into the jet compressor at a rate of around 1,000 to 5,000,000 sch/hr. Injection into or around the jet compressor is controlled by the upstream motive and/or bypass control valves 202/203.

In an alternative embodiment, a recycle compressor circulating the flow between upstream line 301 of the unit operation 302 and the hot effluent stream 306 could be employed. In this scenario, the IAR skid 200 may be utilized if the recycle compressor does not have a large enough flow capacity for cool down, and may share connections with other process streams not designated for cooldown, or may have trouble pumping the coolant steam. The IAR skid 200 would be used to provide excess or completely replace recirculation capability to the unit operation system 300.

Stream 210 is then routed to the unit operation system 300 via line 301, where it cools the unit operation process equipment 302. The warmed stream 303 exits the unit operation and is either sent to a waste system such as a flare stack via the vent line 305 or recycled back as hot effluent stream 306 to the jet compressor 206 where it is used to temper the cold gas stream 205.

The final temperature of the coolant fluid sent to the unit operation is controlled in system 1 through two variables, namely the temperature of the motive stream 205 entering the jet compressor 206 as controlled by the vaporizer 103 or by the ratio of the suction flow of the hot effluent stream 306 to motive flow stream 205. The ratio is controlled by flow control valves on the suction side 208 and the motive side 205 as wells as by liquid pump 102. For instance, in the case of nitrogen gas, a recycle ratio is not likely to exceed a value of 3 as the motive temperature needed to operate at that condition will be sufficient for the fluid to be in the liquid phase instead of gas. Liquid entering the jet compressor will likely result in poor pumping performance or potentially damage the pump.

As stated previously, the unit operation system may include preexisting refrigeration equipment used to cool the process stream in normal operations. This equipment could feasibly be used to assist in the cooldown operations for unit operation 302. Cooling equipment could be taken advantage of if located upstream 301 or on the hot effluent stream 306 of unit operation 302 in-line with the cooling stream path.

A scrubber disposed on hot effluent stream 306 of the unit operation 302 may also be employed for the removal of any condensates/liquids evolved from the unit operation (water or hydrocarbon), particulate that has formed as the result of breakdown of material inside the unit operation, or the removal of various harsh/toxic/flammable gas components such as hydrogen sulfide, $SO_X$, $NO_X$, carbon monoxide, etc.

In accordance with this exemplary embodiment of the invention, the relationship between the ratio of suction flow to motive flow, the temperature of the process stream, the temperature of the motive stream, and the combined or target temperature is utilized to determine the ratio of the mass flow rate of the unit operation effluent stream 306 to the cryogenic vapor/motive flow stream 205 combined in the jet compressor 206. The relationship is as follows:

$$\text{Recycle Ratio ("RR")} \left(\frac{Suc}{Mot}\right)_{mass} = \frac{C_{Mot} * (T_C - T_{Mot})}{C_{Eff} * (T_{Eff} - T_C)}$$

$$RR\left(\frac{Suc}{Mot}\right)_{mass}$$

is defined by the ratio of the mass flow rate of the unit operation effluent $\dot{M}_{Eff}$ to the mass flow rate of the motive fluid $\dot{M}_{Mot}$.

$$RR\left(\frac{Suc}{Mot}\right)_{mass} = \frac{\dot{M}_{Eff}}{\dot{M}_{Mot}}$$

$C_{Mot}$ is the specific heat of the cryogenic or motive fluid.
$C_{Eff}$ is the specific heat of the unit operation effluent stream entering the non-mechanical pump/jet compressor.
$T_C$ is the temperature of the combined fluid or the target temperature of the gas stream exiting the non-mechanical pump.
$T_{Mot}$ is the temperature of the cryogenic or motive fluid.
$T_{Eff}$ is the temperature of the unit operation effluent stream entering the non-mechanical pump.

The temperature of the combined fluid $T_C$ selected is determined by a number of factors including the maximum temperature at any one point of the unit operation $T_{CMAX}$, a maximum allowable differential of temperature between any two points in the unit operation (generally between the temperature of the combined fluid and the maximum temperature of the unit operation) $\Delta T_C$, and a minimum working temperature $T_{CMIN}$ (the lowest acceptable temperature the combined fluid can be, generally at temperature just above the freezing point of water). $\Delta T_C$ is generally a predetermined temperature differential value restricting the level of thermal contraction within the unit operation system. This gradient protects the piping, vessel, etc., from undergoing too much thermal stress that results from cooling the system and may potentially damage equipment. The logic used to describe the relationship is as follows:

$$\text{If } T_{CMAX} - T_{CMIN} > \Delta T_C \text{ Then } T_C = T_{CMAX} - \Delta T_C \qquad 1)$$

$$\text{If } T_{CMAX} - T_{CMIN} < \Delta T_C \text{ Then } T_C = T_{CMIN} \qquad 2)$$

For example, if the maximum temperature at any one point of the unit operation $T_{CMAX}$ is 300° F., the maximum allowable differential of temperature between any two points in the unit operation $\Delta T_C$ is 200° F., and the minimum working temperature $T_{CMIN}$ is 30° F. then the following would be determined:

$$300° \text{ F.} - 30° \text{ F.} = 270° \text{ F. which is greater than } \Delta T_C \text{ of}$$
$$200° \text{ F. therefore } T_C = 300° \text{ F.} - 200° \text{ F.} = 100° \text{ F.} \qquad 1)$$

In this scenario, a recycle ratio $$RR\left(\frac{Suc}{Mot}\right)_{mass}$$

is determined and controlled by the operator inputting the motive temperature $T_{Mot}$ and solving for the ratio $$RR\left(\frac{Suc}{Mot}\right)_{mass}.$$

Here the unit operation effluent temperature $T_{Eff}$ is measured using a temperature element, the specific heats of both the motive fluid $C_{Mot}$ and the unit operation effluent $C_{Eff}$ are determined through a properties database by the temperature and pressure of the respective fluids, and the temperature of the combined fluid is determined by a relationship similar to the one stated above.

Likewise, the operator may prefer to determine and control the motive temperature $T_{Mot}$ by inputting a set recycle ratio $$RR\left(\frac{Suc}{Mot}\right)_{mass}.$$

Here the operator would determine the motive temperature $T_{Mot}$ through the following relationship:

$$T_{Mot} = T_C - \frac{RR\left(\frac{Suc}{Mot}\right)_{mass} * C_{Eff} * (T_{Eff} - T_C)}{C_{Mot}}$$

The process may be a mobile skid brought in by the service provider, a permanent install fixture, or a mix of both (e.g. permanently installed hard line piping with the jet compressor brought to the site).

If the operator is capable of recirculating gasses within the unit operation system and practices cryogenic gas cooling as called for in the present invention, it allows for two possible benefits: 1) enhancing gas flow rate within the unit operation while maintaining or improving emissions or 2) reducing coolant gas consumption required to achieve cool down. The following figures show an example reactor used to illustrate both benefits. The data is empirical, and the figures depict a simulated cool down.

The unit operation is designed based on the following assumptions: The unit operation is a reactor holding catalyst material. Cooling of the catalyst material and the reactor mass is solely considered, while the associated piping, valving, etc. is not. The reactor system undergoes a purge cycle first in which the entirety of the reactor volume is displaced by nitrogen. This purge stage is similar in operation to the "once-through" cooling described above, with respect to the related art.

| Reactor Characteristics: | Operation Guidelines: |
|---|---|
| Catalyst weight: 500,000 lbs | Max System ΔT: 150° F. |
| Catalyst Heat Capacity: 0.24 btu/lb-F | Reactor Start Temp: 300° F. |
| Reactor Weight: 1,250,000 scf | Process End Temp: 100° F. |

-continued

| Reactor Characteristics: | Operation Guidelines: |
|---|---|
| Reactor Heat Capacity: 0.108 btu/lb-F | Minimum Gas Temp: 30° F. |
| Reactor Purge Volume: 250,000 scf | Reactor Pressure: 500 psig |
| | Cooling Fluid Rate: |
| | 230,000 scfh |
| | Target Recycle Ratio: 1 |

Figure 2:
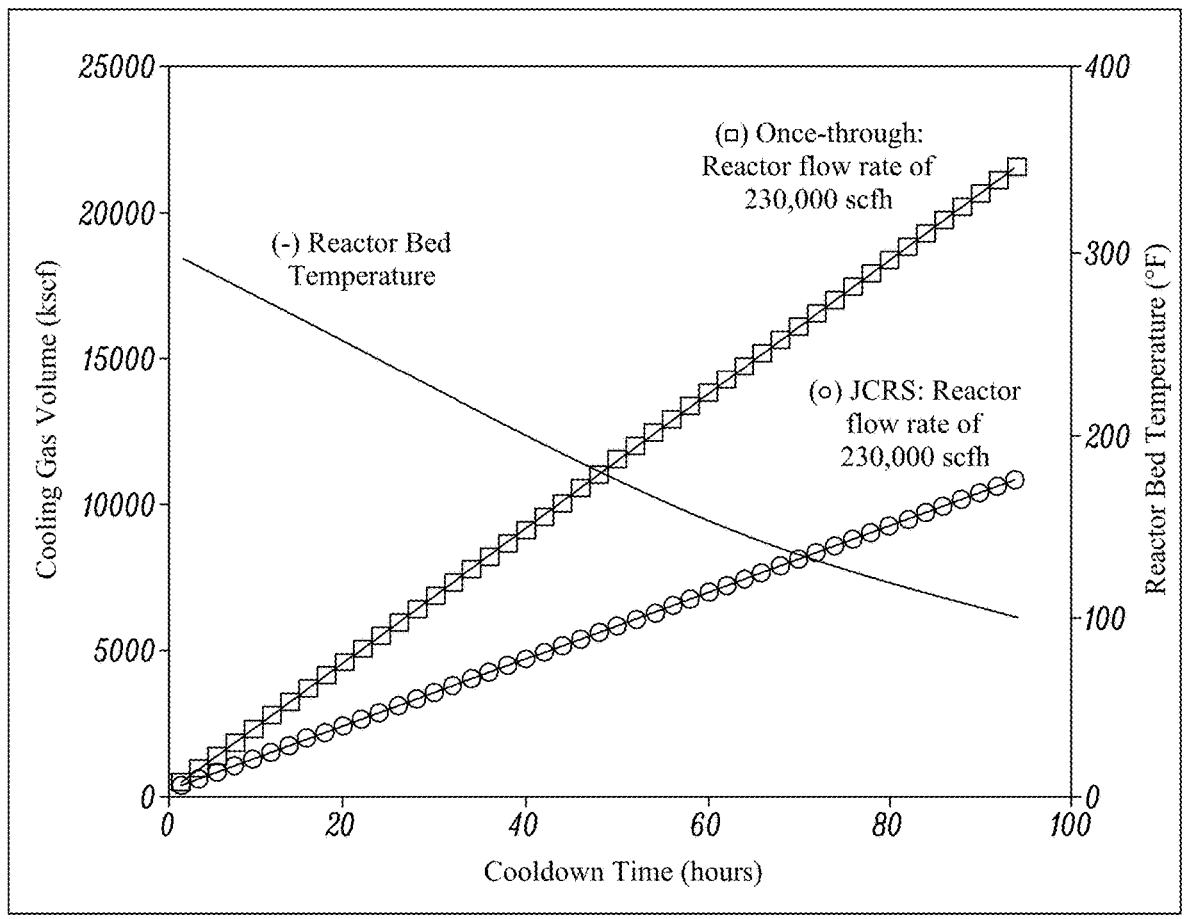
FIG. 2 is a process example where the system in FIG. 1 is used to reduce the coolant gas consumption by circulating 50% of the total flow.

FIG. 2 shows a scenario in which, after the completion of the purge stage, ~50% of the nitrogen consumption is reduced by recirculating existing reactor gasses. Here, the flow rate of injected gas is halved to account for the recirculated gas, maintaining a total flow rate of 230,000 scf/hr through the reactor. The injected cryogenic nitrogen gas is mixed with the recirculated process stream to achieve the proper outlet temperature. The jet compressor operates at a suction/motive recycle ratio of ~1.0. The advantages shown here is the reduction of nitrogen usage while maintaining the same flow rate through the reactor and therefore same time to reach cooldown. Since some of the gas is recirculated rather than vented, there is a reduction of the inert gas heading to the flare, potentially freeing up flare capacity for other purging activities.

Figure 3:
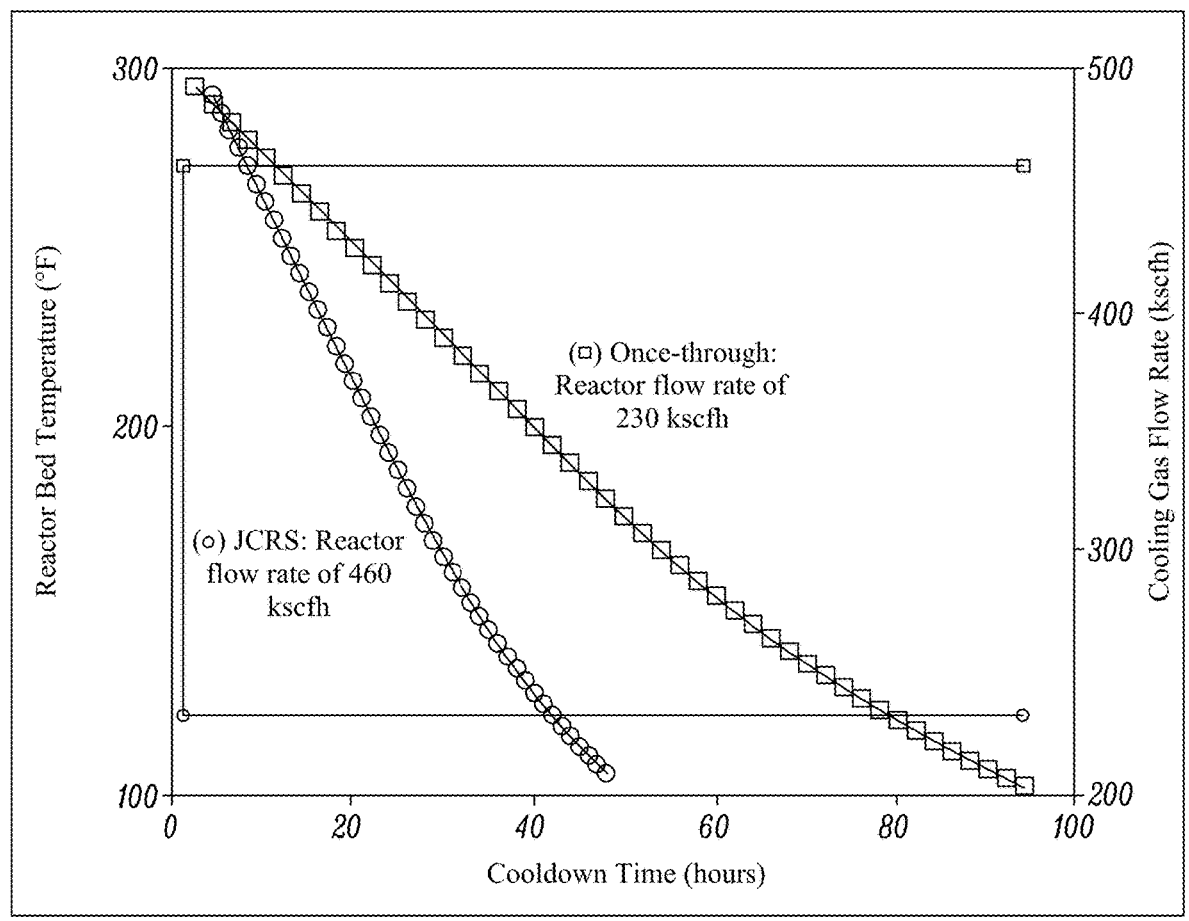
FIG. 3 is a process example where the system in FIG. 1 is used to reduce the cooldown time of a unit operation 50% by double the flow rate of coolant in the unit operation.

FIG. 3 shows an alternative process where the gas injection flow rate (230,000 scf/hr) is maintained, doubling the total flow rate of gasses in the reactor once recirculation begins (i.e. a total flow rate of 460,000 scfh/hr). Here the clear advantage is time saved. After recirculation begins, the cooling time is cut in half by the doubled flow rate through the reactor. Another benefit is that the BTU value of the gas heading to the flare is maintained when shifting from the purge to recirculation stage.

The present invention has been estimated to reduce nitrogen consumption by up to ⅔ (depending on jet compressor performance), making this method both more economical and better for emissions with flaring. As stated, the invention is an enabler for cryogenic nitrogen assisted cooling. This invention is a first of its kind, expanding the capable unit operations for cryogen gas cooling.

Figure 4:
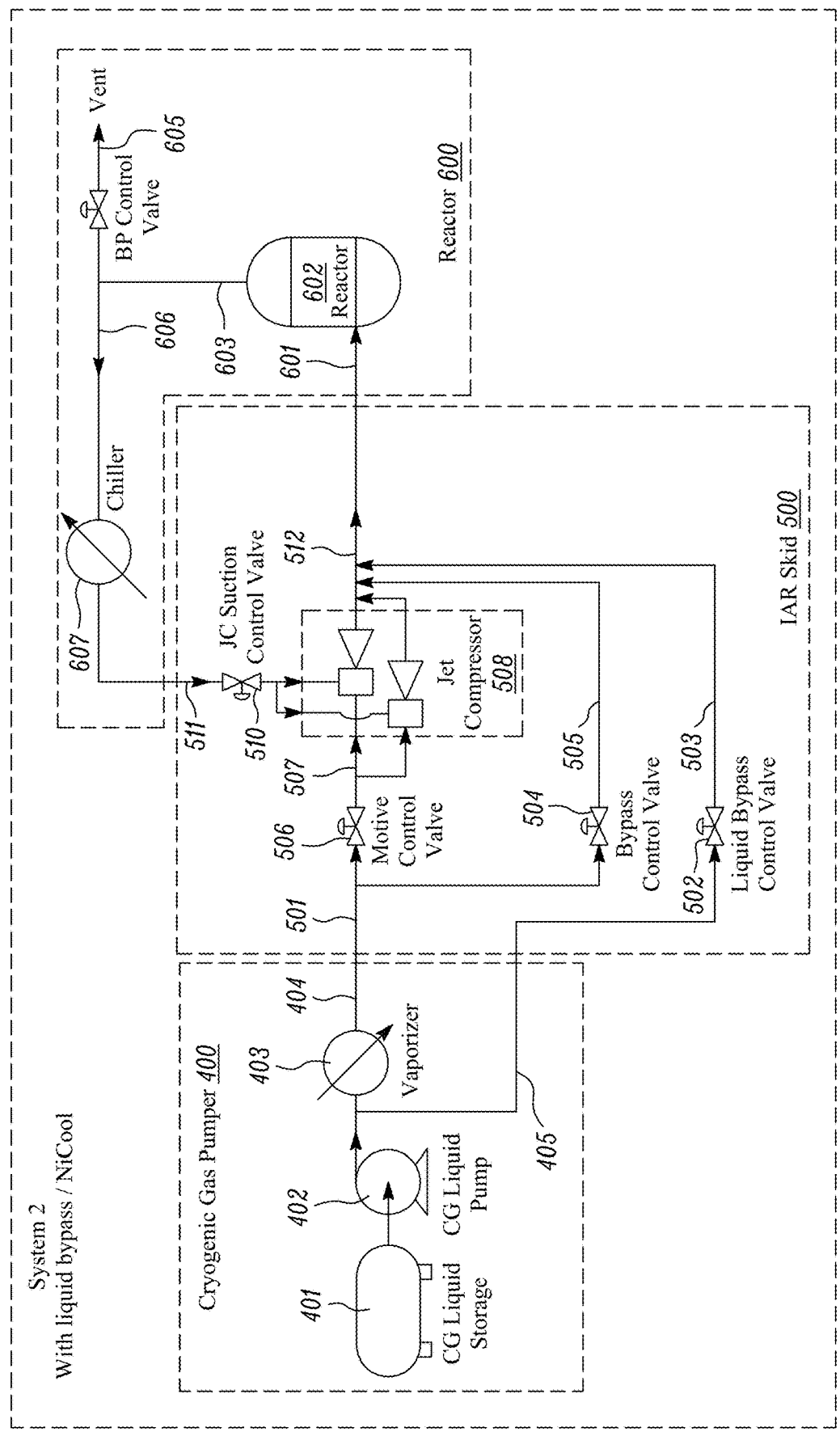
FIG. 4 is another embodiment of the process schematic of the invention depicted in FIG. 1, where the addition of a liquid bypass is used to further cool the feed coolant after it has been mixed with the unit operation effluent.

An alternative exemplary embodiment is depicted in FIG. 4. System 2 includes a liquid bypass 405 that routes the liquid fed from upstream of vaporizer 403 to add additional cooling capacity to the process stream 512. While FIG. 4 depicts the bypassing portion of the liquid heading to the vaporizer 403, alternatively a separate liquid storage vessel (and pump) could be used. In a similar manner to system 1 of FIG. 1, system 2 is employed to prepare and inject a gas coolant for cooling a unit operation 602 and its constituents (such as catalysts, vessels, and pipes) from an elevated temperature (300° F. to 500° F.) to ambient (below 100° F.). Fluid temperatures are entering the unit operation 600 are adjusted to some delta of the unit operation's 600 operating temperature or to a minimum working temperature of around −50° F. to 50° F. System 2 includes the three sections in fluid communication: cryogenic gas pumper 400, the injection and recycle skid 500, and the target unit operation 600 system (inclusive of unit operation 602). The cryogenic gas pumper 400 provides coolant in the form cold gas (from −452° F. to 50° F. @ 14.7 to 2,000 psi) (or liquid at −452 to 50° F.) at a rate of around 1,000 to 5,000,000 sch/hr and acts as the main source of pressure, flow, and motive force for the injection and recycle skid (i.e., "IAR skid") 500. A cryogenic storage vessel 401 provides liquid flow to a pump 402 that feeds into a heater/heat exchanger 403 that vaporizes the liquid. The vapor is routed to the injection and recycle system 500 via lines 404 and 501. The temperature of the gas stream entering the injection and recycle skid 501 is controlled by an onboard control system (not shown) regulating the heat input to the vaporizer 403. The bypass line starts upstream of the vaporizer 403 and routes liquid downstream of the jet compressor(s) 508 at a rate of around 1,000 to 5,000,000 sch/hr to provide additional cooling.

The cryogenic gas pumper 400 provides coolant in the form cold gas (from −452° F. to 50° F. @ 14.7 to 2,000 psi) (or liquid at −452 to 50° F.) at a rate of around 1,000 to 5,000,000 sch/hr and acts as the main source of pressure, flow, and motive force for the injection and recycle skid (i.e., "IAR skid") 500. A cryogenic storage vessel 401 provides liquid flow to a pump 402 that feeds into a heater/heat exchanger 403 that vaporizes the liquid. The vapor is routed to the injection and recycle system 500 via lines 404 and 501. The temperature of the gas stream entering the injection and recycle skid 501 is controlled by an onboard control system (not shown) regulating the heat input to the vaporizer 403. The bypass line starts upstream of the vaporizer 403 and routes liquid downstream of the jet compressor(s) 508 at a rate of around 1,000 to 5,000,000 sch/hr to provide additional cooling. The liquid is routed via line 405 where its flow regulated by control valve 502. The liquid then flows through bypassed liquid flow from line 503 were it combines with the process stream at an injection point in line 512 It should be noted that the injection of liquid could occur both downstream of the jet compressor 508 (at point in line 512) and upstream on the suction side at point in line 511.

The injection and recycle skid 500 comprises of various pipes, valves, and instrumentation used to regulate the flow of fluid into the jet compressor or multiple jet compressors 508 and the downstream unit operation 600. The cold gas (from −452° F. to 50° F. @ 14.7 to 2,000 psi) from the pumper 402 is routed to the IAR skid 500 and sent either through the jet compressor(s) 508 where it is tempered (to −50 F to 100° F. or Unit operation temperature −ΔT @ 14.7 to 1,000 psi) by a hot effluent stream from line 511 (from 50° F. to 500° F. @ 14.7 to 1,000 psi) coming from the unit operation system 600 or bypassed around the jet compressor in line 505 to provide "clean" coolant to the unit operation in the event system 2 is being purged or inerted. The hot effluent stream from line 511 is pumped into the jet compressor at a rate of around 1,000 to 5,000,000 sch/hr. Injection into or around the jet compressor is controlled by the upstream valves 505.

The stream then enters the unit operation system 600 via line 601 where it interacts with the unit operation process equipment 602 and its constituents cooling them. The warmed stream 603 exits the unit operation and is either routed to a waste system such as a flare stack via the vent line 605 or recycled back as stream 606 to the jet compressor 508 where it is used to temper the cold gas streams 507 and 503.

The final temperature of the coolant fluid sent to the unit operation can be controlled in system 2 through three variables, namely the temperature of the motive stream in line 507 entering the jet compressor 508 (as controlled by the vaporizer 404), the ratio of suction flow of hot effluent from line 511 to motive flow from line 507, or by the ratio of suction flow of hot effluent from line 511 to the bypassed liquid flow from line 503. The ratios of mass flow are controlled by flow control valves on the suction side 510 and the motive side 506, the liquid bypass side 502, and by liquid pump 402.

While the embodiment of FIG. 4 depicts the liquid being added to a downstream portion of the recycle system, in line 512, it can also be added to the upstream portion of the effluent entering the jet compressor 508.

The liquid source can be from the bypass line of the same pumping unit 400 or another liquid nitrogen source which can be driven by storage pressure rather than a pump (i.e. pump 402). This may be advantageous as compared to using pump 402, as the operator is not subjected to the limitations of the pump (low flow limit) and there is no requirement to balance the flows in two directions.

Similar to system 1 depicted in the embodiment of FIG. 1, there is an established relationship between the ratio of suction flow to motive flow, ratio of suction flow to bypass liquid flow, the temperature of the process stream, the temperature of the motive stream, and the combined or target temperature. The relationship is as follows:

$$\text{Recycle Ratio ("}RR\text{")}\left(\frac{Suc}{Mot}\right)_{mass} = \frac{C_{Mot}*(T_C - T_{Mot})}{C_{Eff}*(T_{Eff} - T_C) - \left[\frac{1}{RR\left(\frac{Suc}{BLiq}\right)_{mass}}*(C_{BLiq}*(T_C - T_{BLiq}) + \lambda_{BLiq})\right]}$$

$$RR\left(\frac{Suc}{Mot}\right)_{mass}$$

is defined by the ratio of the mass flow rate of the unit operation effluent $\dot{M}_{Eff}$ to the mass flow rate of the motive fluid $\dot{M}_{Mot}$.

$$RR\left(\frac{Suc}{Mot}\right)_{mass} = \frac{\dot{M}_{Eff}}{\dot{M}_{Mot}}$$

$$RR\left(\frac{Suc}{BLiq}\right)_{mass}$$

is defined by the ratio of the mass flow rate of the unit operation effluent $\dot{M}_{Eff}$ to the mass flow rate of the bypass liquid $\dot{M}_{BLiq}$.

$$RR\left(\frac{Suc}{BLiq}\right)_{mass} = \frac{\dot{M}_{Eff}}{\dot{M}_{BLiq}}$$

$C_{Mot}$ is the specific heat of the motive fluid.
$C_{Eff}$ is the specific heat of the unit operation effluent stream entering the non-mechanical pump.
$C_{BLiq}$ is the specific heat of the liquid bypassing the vaporizer and jet compressor.
$T_C$ is the temperature of the combined fluid or the target temperature of the gas stream exiting the non-mechanical pump.
$T_{Mot}$ is the temperature of the motive fluid.
$T_{Eff}$ is the temperature of the unit operation effluent stream entering the non-mechanical pump.

$T_{BLiq}$ is the temperature of the liquid bypassing the vaporizer and jet compressor.

$\lambda_{BLiq}$ is the specific latent heat of vaporization of the liquid bypassing the vaporizer and jet compressor.

It can also be recognized using the same formulas described above that $$RR\left(\frac{Suc}{Mot}\right)_{mass}$$

and $T_{Mot}$ cane be selected by the operator and $$RR\left(\frac{Suc}{BLiq}\right)_{mass}$$

solved for. Likewise, the operator may prefer to determine and control the motive temperature $T_{Mot}$ by inputting a set recycle ratios:

$$RR\left(\frac{Suc}{Mot}\right)_{mass} \text{ and } RR\left(\frac{Suc}{BLiq}\right)_{mass}.$$

Here the operator would determine the motive temperature $T_{Mot}$ through the following relationship:

$$T_{Mot} = T_C - \frac{RR\left(\frac{Suc}{Mot}\right)_{mass} * \left\{ C_{Eff} * (T_{Eff} - T_C) - \left[ \frac{1}{RR\left(\frac{Suc}{BLiq}\right)_{mass}} * (C_{BLiq} * (T_C - T_{BLiq}) + \lambda_{BLiq}) \right] \right\}}{C_{Mot}}$$

Similarly $T_{Mot}$ can also be represented by:

$$T_{Mot} = T_C - \frac{RR\left(\frac{Suc}{Mot}\right)_{mass} * C_{Eff} * (T_{Eff} - T_C) - RR\left(\frac{BLiq}{Mot}\right)_{mass} * (C_{BLiq} * (T_C - T_{BLiq}) + \lambda_{BLiq})}{C_{Mot}}$$

$$RR\left(\frac{BLiq}{Mot}\right)_{mass}$$

is defined by the ratio of the mass flow rate of the bypass liquid $\dot{M}_{BLiq}$ to the mass flow rate of motive fluid $\dot{M}_{Mot}$.

$$RR\left(\frac{BLiq}{Mot}\right)_{mass} = \frac{\dot{M}_{BLiq}}{\dot{M}_{Mot}}$$

The following example is used to demonstrate how this inclusion of the liquid bypass allows for additional refrigeration to be brought within the unit operation system and further reduce coolant gas consumption required to achieve cooldown. The addition of the liquid injection allows for greater recirculation rates to be achieved by the jet compressor without the risk of sending liquid coolant to the jet compressor. Liquid entering the jet compressor will greatly impact the performance of the equipment as the expansion of the liquid to gas downstream of the nozzle will significantly reduce suction capacity. On top of that, the liquid passing through the nozzle may be abrasive and damage the pump due the high velocities experienced within the nozzle. The following figure shows the benefit to the example reactor used in FIG. 4. The data is empirical, and the figures depict a simulated cool down. The unit operation is designed based on the previously stated assumptions.

Figure 5:
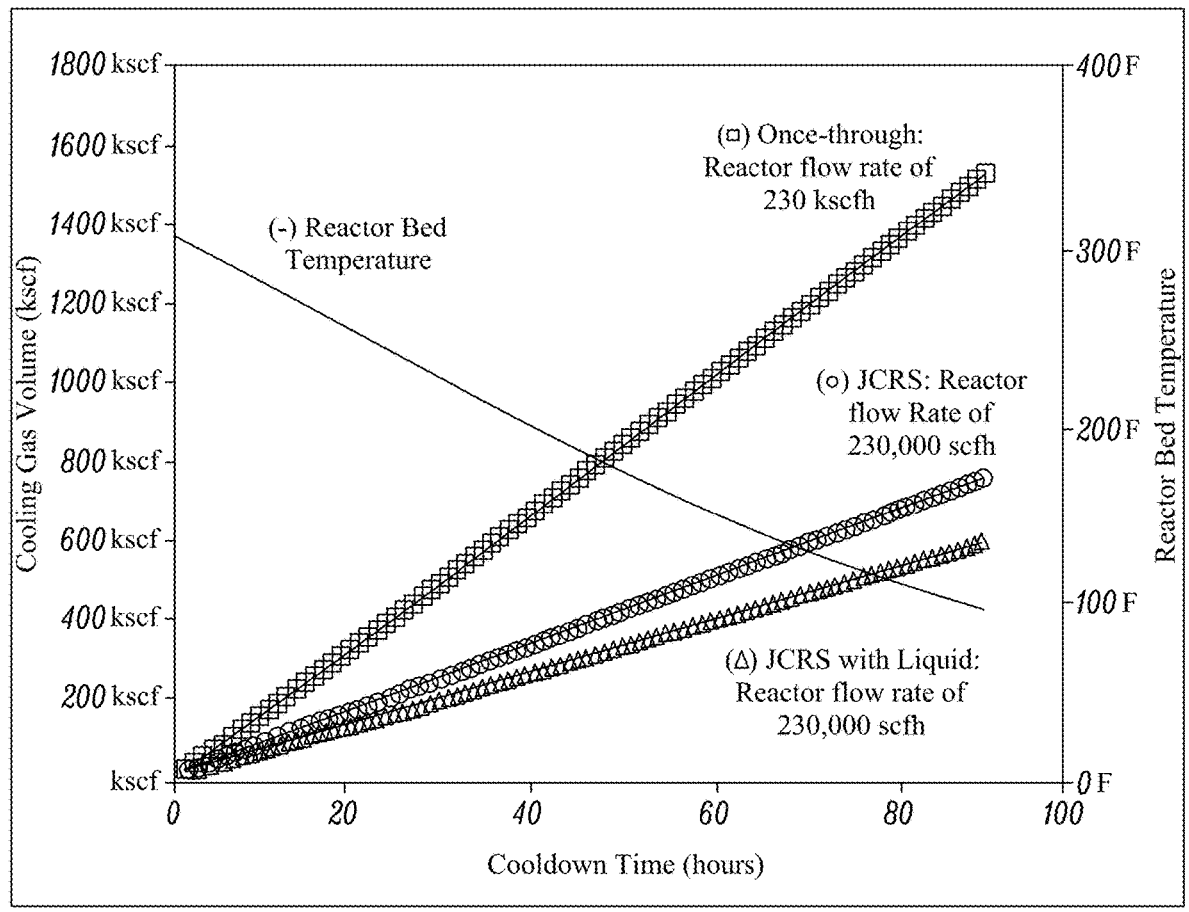
FIG. 5 is a process example where the system in FIG. 4 is used to reduce the coolant gas consumption by circulating 63% of the total flow.

FIG. 5 depicts an example in which, after the completion of the purge stage, ~63% of the nitrogen consumption is reduced by recirculating existing reactor gasses. Here, the flow rate of injected gas is reduced by approximately two-thirds to account for the recirculated gas, maintaining a total flow rate of 230,000 scf/hr through the reactor. The injected vaporized nitrogen gas and cryogenic nitrogen liquid are mixed with the recirculated process stream to achieve the proper outlet temperature. The jet compressor operates at a suction/motive recycle ratio of ~2.0, with a liquid/gas motive injection rate of ~0.18. The advantages shown here is the reduction of nitrogen usage while maintaining the same flow rate through the reactor and therefore same time to reach cooldown. Since some of the gas is recirculated rather than vented, there is an improvement in the BTU value of the gas heading to the flare, potentially freeing up flare capacity for other purging activities. While the invention has been described in detail with reference to specific embodiments thereof, it will become apparent to one skilled in the art that various changes and modifications can be made, and equivalents employed, without departing from the scope of the appended claims.

What is claimed:

1. A method for direct cooling of a unit operation with a combination of a vaporized motive fluid stream and at least a portion of an effluent gas stream from the unit operation, wherein the direct cooling method comprises:
   a. circulating a portion of said effluent gas stream from the unit operation with one or more non-mechanical pumps where the vaporized motive fluid stream is provided as a motive force wherein said unit operation is under a fixed heat load having a temperature in the range of 300 to 500° F.;
   b. providing the vaporized motive fluid stream to the one or more non-mechanical pumps at a temperature in the range of −452° F. to 50° F.;
   c. forming a cooling stream by combining said effluent gas stream from the unit operation and the vaporized motive fluid in the one or more non-mechanical pumps, wherein the cooling stream has a temperature in the range of −50° F. to 300° F.;
   d. adjusting a recycle ratio of mass flow rates of said effluent gas stream from the unit operation to the vaporized motive fluid stream combined in the one or more non-mechanical pumps wherein the recycle ratio is determined by:

$$\text{Recycle Ratio}_{mass} = \frac{C_{Mot} * (T_C - T_{Mot})}{C_{Eff} * (T_{Eff} - T_C)}$$

where,
the Recycle Ratio$_{mass}$ is the ratio of the mass flow rate of the effluent to the mass flow rate of the vaporized motive fluid stream;

$C_{Mot}$ is the specific heat of the vaporized motive fluid stream;

$C_{Eff}$ is the specific heat of the unit operation effluent stream entering the one or more non-mechanical pumps;

$T_C$ is the temperature of the cooling stream or a target temperature of the cooling stream exiting the one or more non-mechanical pumps;

$T_{Mot}$ is the temperature of the vaporized motive fluid stream, and is selected by the operator;

$T_{Eff}$ is the temperature of the unit operation effluent stream entering the one or more non-mechanical pumps; and direct cooling of said unit operation under the fixed heat load to a lower temperature by routing the cooling stream to the unit operation.

2. The method of claim 1, wherein $T_C$ used in the determination of Recycle Ratio is equal to $T_{CMAX}-\Delta T_C$ if $T_{CMAX}-T_{CMIN}>\Delta T_C$, where $T_{CMAX}$ is a maximum temperature at any one point of the unit operation, $T_{CMIN}$ is a minimum temperature of the cooling stream, and $\Delta T_C$ is a predetermined value of a maximum allowable differential temperature between any two points of the unit operation.

3. The method of claim 1, wherein $T_C$ used in the determination of Recycle Ratio is equal to $T_{CMIN}$ if $T_{CMAX}-T_{CMIN}<\Delta T_C$, where $T_{CMAX}$ is the maximum temperature of the unit operation, $T_{CMIN}$ is a minimum temperature of the cooling stream, and $\Delta T_C$ a predetermined value of a maximum allowable differential temperature between any two points of the unit operation.

4. The method of claim 1, wherein a flow rate of the vaporized motive fluid stream is in the range of 1,000 scf/hr to 5,000,000 scf/hr.

5. The method of claim 1, wherein a flow rate of a portion of the effluent gas stream is in the range of 1,000 scf/hr to 5,000,000 scf/hr.

6. The method of claim 1, wherein the pressure range of the unit operation is in the range of 0 psig to 1,000 psig.

7. The method of claim 1, wherein the temperature differential between any two points in the unit operation is no greater than 300° F.

8. The method of claim 1, wherein the temperature of the cooling stream is at a lower temperature than the temperature of the unit operation.

9. The method of claim 1, wherein the vaporized motive fluid is selected from the group consisting of nitrogen, carbon dioxide, argon, and helium.

10. The method of claim 1, wherein the unit operation is selected from the group consisting of reactors, distillation columns, rectification columns, storage vessels, strippers, heat exchangers, gas turbines, process heaters, furnaces, and boilers.

11. The method of claim 1, wherein the method is used in the cooling of multiple sections of the same unit operation.

12. The method of claim 1, wherein the method utilizes a scrubber for removing water, hydrocarbon condensates, particulate, hydrogen sulfide, or other contaminants from the effluent stream.

* * * * *